(12) United States Patent
Roberts

(10) Patent No.: US 6,257,864 B1
(45) Date of Patent: Jul. 10, 2001

(54) APPARATUS FOR DIRECTING HEAT IN A TUBE BENDING MACHINE

(75) Inventor: Bradley D. Roberts, Glennie, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/336,238

(22) Filed: Jun. 18, 1999

(51) Int. Cl.$^7$ .................................................. B29C 53/02
(52) U.S. Cl. ........................... 425/384; 425/392; 264/339
(58) Field of Search ................................... 425/384, 392, 425/393; 264/295, 339

(56) References Cited

U.S. PATENT DOCUMENTS

| | | | |
|---|---|---|---|
| 1,877,629 | * 9/1932 | Replogle | 264/573 |
| 3,562,860 | * 2/1971 | Rottner et al. | 425/384 |
| 3,965,715 | 6/1976 | Parmann | 72/342 |
| 4,080,141 | 3/1978 | Usui | 425/393 |
| 4,129,328 | 12/1978 | Littell | 294/65 |
| 4,156,588 | 5/1979 | Miller et al. | 425/392 |
| 4,336,222 | 6/1982 | Prohn | 264/519 |
| 5,200,124 | 4/1993 | Bowkett | 264/25 |
| 5,427,363 | 6/1995 | Rink et al. | 269/21 |

FOREIGN PATENT DOCUMENTS

| | | |
|---|---|---|
| 23 45 644 | 3/1975 | (DE) . |
| 3939352 | * 6/1991 | (DE) . |
| 93 04 603 | 6/1993 | (DE) . |
| 297 23 809U | 4/1999 | (DE) . |
| 0 486 237 | 5/1992 | (EP) . |
| 0 875 358 | 11/1998 | (EP) . |
| 2702991 | * 9/1994 | (FR) . |
| WO 97 07969 | 3/1997 | (GB) . |
| 59-169835 | * 9/1984 | (JP) . |

OTHER PUBLICATIONS

PA–12–Rohre Mit Infrarotstrahlern Warmformen, Kunststoffe, De, Carl Hanser Verlag. Munchen, vol. 82, No. 3, Mar. 1, 1992, pp. 184–188.

* cited by examiner

Primary Examiner—James P. Mackey
Assistant Examiner—Donald Heckenberg
(74) Attorney, Agent, or Firm—Robert P. Seitter

(57) ABSTRACT

An apparatus and method for forming a bend in a thermoplastic tube including a fixture having a former with a bend. A clamp holds the tube in place while an upper form and lower form sandwiches the tube therein. Infrared lights are positioned against the bends of the upper and lower forms. The upper and lower forms are made of a Teflon material to allow the infrared wavelengths to flow therethrough and heat only the bend of the tube. Another embodiment includes a hollow box having a top surface with a groove formed therein to correspond to the desired shape and bend of the tube. Along the bend portion of the groove are slots. The hollow upper box is connected to a solid lower box having air intake holes therethrough to the hollow interior of the upper box. Cold or hot air enters through one of the intake holes and is directed through the slots to the bend portion of the tube.

9 Claims, 3 Drawing Sheets

APPARATUS FOR DIRECTING HEAT IN A TUBE BENDING MACHINE

FIELD OF THE INVENTION

The invention concerns a method and apparatus for forming tubes into required configurations, especially tubes made of a thermoplastic material.

BACKGROUND OF THE INVENTION

Thermoplastic tubes formed to various configurations are used in a number of environments. Current methods for bending the thermoplastic tubes consist of time consuming and expensive operations. This presents a significant disadvantage when a large number of tubes are required for a particular manufacturing application such as in the automotive field as used for hydraulic, fluid, coolant, vapor, and oil conduits. One consideration for the manufacturer when devising a new method or apparatus for bending tubes is to search for a cost cutting method that maintains the high standard of quality and reduces production cost. Related concerns include the number of cycles or pieces bent per hour, retooling costs for production change, and flooring space required.

SUMMARY OF THE INVENTION

It is the intent of the invention to address the aforementioned concerns. The method to achieve a forming of a bend in a tube of a thermoplastic material includes the steps of providing a former and an adjacent halogen infrared light, supporting the tube internally within the former, controlling the emission of infrared lights to heat the bend of the tube, and then transferring cold air directly to the bend of the tube to provide a permanent thermoformed bend in the tube.

The invention provides an apparatus for forming the bend in the tube of a thermoplastic material wherein the former has an upper and lower portion and means for supporting the tube internally within the former. At least one infrared light is provided on the apparatus for heating the bend of the tube therein.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE EXEMPLARY EMBODIMENTS

Figure 1:
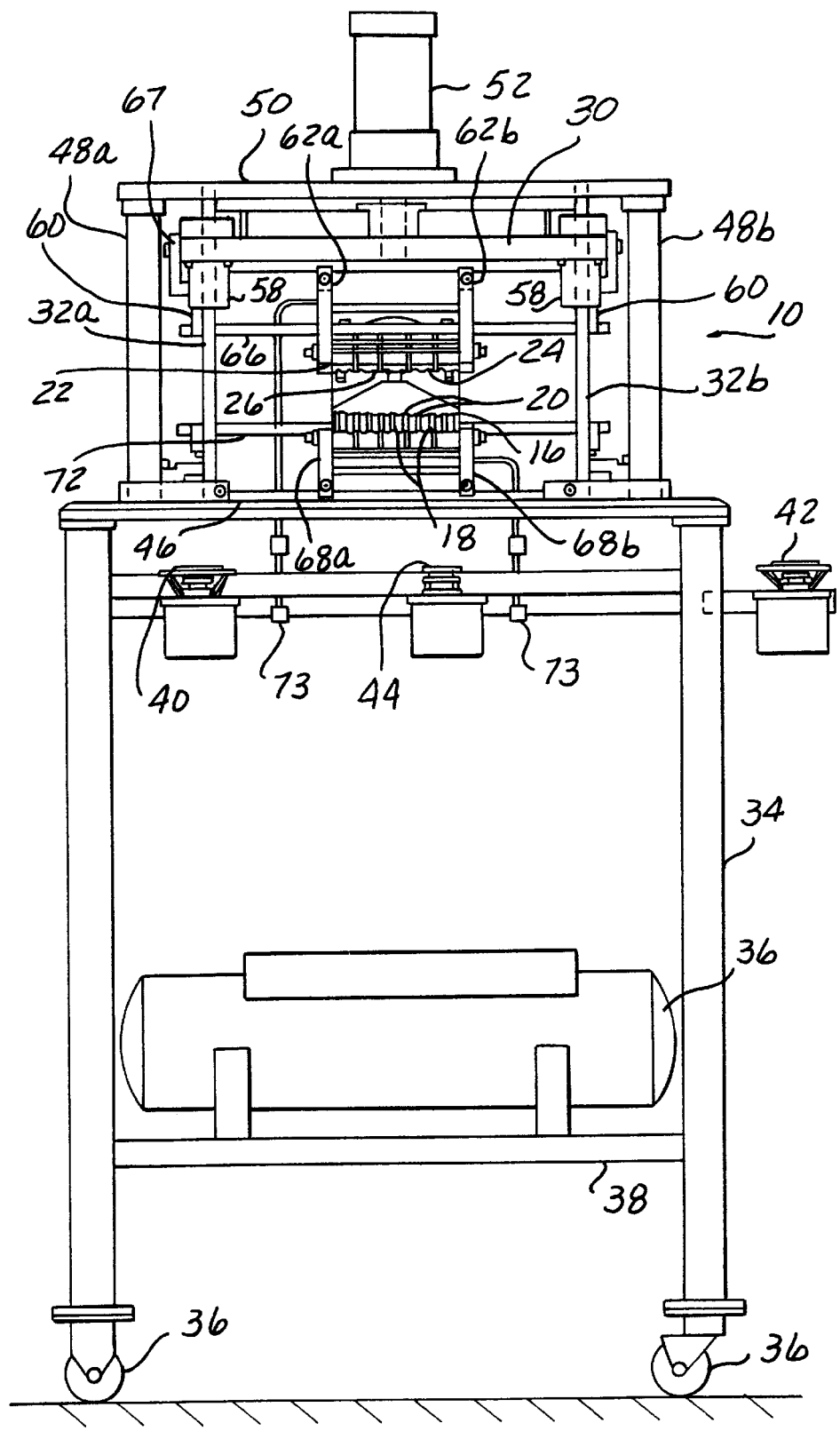
FIG. 1 is a schematic illustration of the apparatus according to the present invention.
Figure 2:
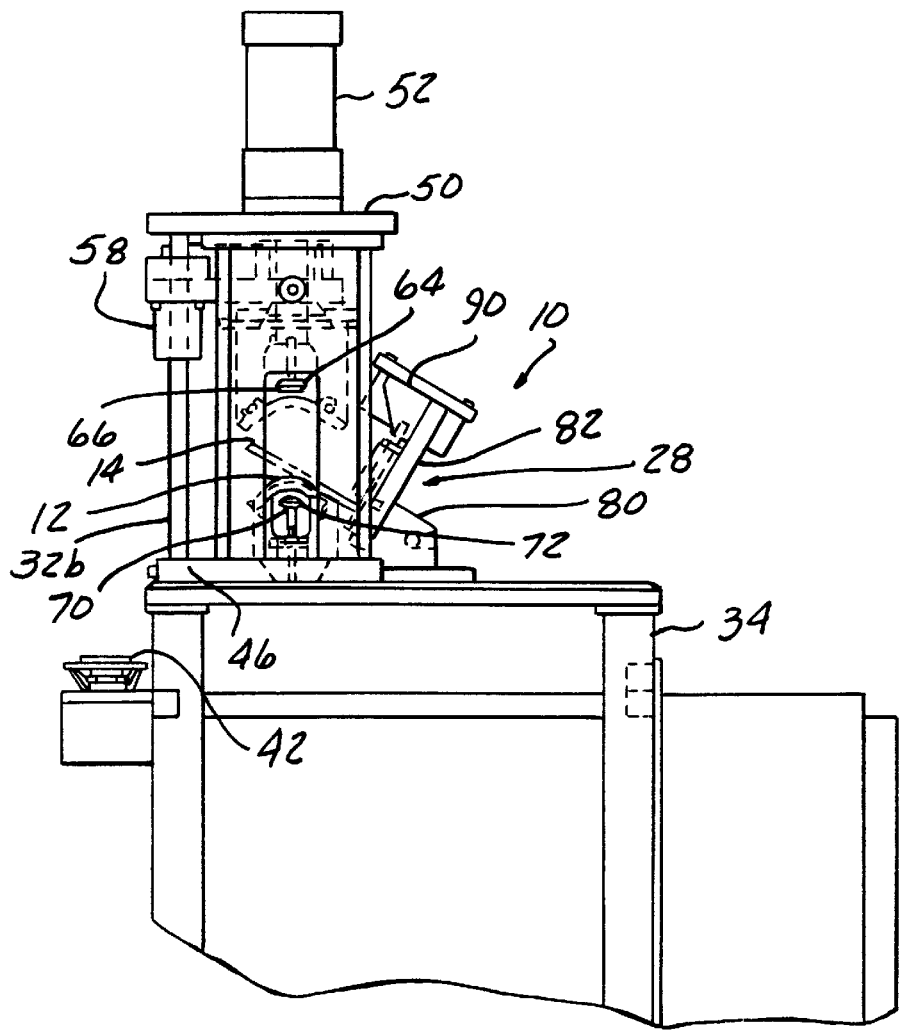
FIG. 2 is a side elevational view of the apparatus of FIG. 1.
Figure 3:
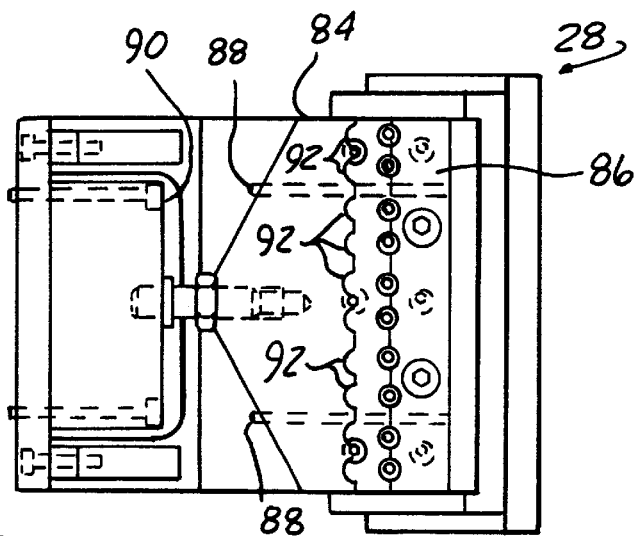
FIG. 3 is a plan view of the rear clamp for the apparatus.

Looking first at FIGS. 1–3, there is shown an infrared tube bending machine 10 which bends and then heats the bend portion 12 only of a plastic tube 14. The machine 10 then transfers cold air directly to the bend portion 12 of the plastic tube 14. This places a permanent thermoformed bend in the plastic tube 14 without using any oven as is the current process.

The infrared tube bending machine 10 includes a lower form 16 providing slots 18 for multiple tubes and a lower form tube spacer 20. The bending machine 10 further includes an upper form 22 having a plurality of slots 24 coinciding with the slots 18 of the lower form 16. The upper form 22 also has spacers 26 therebetween the slots 24. The upper and lower forms are made from Teflon material which acts as an insulator and does not absorb energy from the infrared energy. Looking at FIGS. 2 and 3, the bending machine 10 further includes a clamp 28 at the rear of the machine to hold down the tubes 14. The upper form 22 is held by a carriage or clamp plate 30 having reciprocal movement along a form guide rod 32. The lower form 16 remains stationary on a top shelf of a stand 34 while the upper form 22 is moveable in a downward direction for placement over the lower form 16 with the tubes 14 to be bent therebetween and held by the clamp 28.

The infrared tube bending machine 10 of the present invention is a portable unit that can be placed on a typical stand 34 having rollers 36 for ease of transporting the machine 10. The moveable carrier 34 may be outfitted with an air cylinder supply container 36 on a lower shelf 38 for providing the cold air supply to the machine. Cycle start buttons 40, 42 in the form of palm buttons are also provided for the operator to initiate operation of the machine 10 once the tubes 14 are in place. An emergency stop 44 in the form of a push/pull button is also provided for emergency purposes.

The machine 10 is connected to the portable cart 34 by a base plate 46. Two outer risers 48a, 48b form lateral portions of a frame around the machine to support the machine in place. A bridge plate 50 spans the upper portion between the two risers 48a, 48b. Connected to the bridge plate 50 is an air cylinder 52 having a through access to the machine for activating the movement of the upper form 22. Positioned inwardly from the two outside risers 48a, 48b are the pair of guide rods 32a, 32b that raise and lower the upper form 22. The upper form 22 is connected to the clamp plate 30 that spans between the two guide rods 32a, 32b and is connected thereto. The clamp plate 30 is connected to a bushing flange 58 that is capable of riding up and down the guide rods 32a, 32b. An upper lamp mounting bracket 60 is attached to each bushing flange 58 so that the lamp mounting may move with the bushing flange 58 along the travel of the guide rods 32a, 32b. A pair of retainer brackets 62a, 62b for the upper form 22 extend vertically below the clamp plate 30. The retainer brackets 62a, 62b hold the upper form 22 therebetween by suitable threaded means. Looking at FIG. 2, each retainer bracket 62a and 62b includes a through aperture 64 in each retainer bracket 62a, 62b for placement of a halogen infrared tube 66. The apertures 64 in the retainer brackets 62a, 62b are positioned directly above and adjacent to the bend in the form. The halogen infrared tube 66 is placed through the apertures 64 in the upper form 22 retainer brackets 62a, 62b and held in place by the upper lamp mounting bracket 60 to the bushing flange 58. To accurately position the halogen tube 66 relative to the clamp plate mounting 30, a mounting clip riser 67 may be used to raise or lower the halogen tube 66. The location of the apertures 64 in the retainer brackets 62a, 62b are directed so that the halogen tube 66 will heat only the bent portion 12 of the tube 14.

The lower form 16 is attached to the base plate 46 by means of lower retainer brackets 68a, 68b similar to the upper retainer brackets 62a, 62b mentioned as discussed infra. The lower retainer brackets 68a, 68b also include apertures 70 similar to those found in the upper retainer brackets. The apertures 70 provide a through access for a lower halogen infrared tube 72. The halogen tube 72 is connected to the guide rods 32a, 32b by means of lamp mounting brackets 60 and a clip riser 74 to position the lamp 72 at the correct height. The lower halogen tube 72 is again positioned to heat only the bend portion 12 of the tube 14, and is therefore located adjacent the bend portion of the lower form 16. Pipes 73 are connected at one end to a cool air source and are directed at the other end to the upper and lower forms 22 and 16 respectively. Pipes 73 provide vortex cooled air to the tubes 14 located in the infrared tube bending machine.

Now looking at FIGS. 2 and 3, a clamp 28 is angularly positioned at the rear of the bending machine 10 as shown in FIG. 2. The clamp 28 includes a clamp plate mounting bracket 80 having an angular surface for positioning the clamp mounting plate 82. The clamp mounting plate 82 holds the upper clamp 84 and lower clamp 86. The upper clamp 84 is moveable along a pair of clamp guide rods 88. The movement of the upper clamp 84 is actuated by an air cylinder 90. The upper clamp 84 includes semi-circular grooves 92 positioned and configured for receiving the plastic tubes 14 located in the bending machine 10.

Before placement of the tubes 14 into the bending machine, each tube may be filled with a spring member (not shown) to prevent collapse of the tubes during the bending process. The tubes 14 are placed within the slots 18 of the lower form 16 by an operator. After the plastic tubes 14 are placed on the lower form 16 of the bending machine 10, the operator can then actuate the clamp 28 so that upper clamp 84 slides down over the tubes 14 to hold them in place. A portion of the tubes are held in grooves 92 of the clamp 28. Once the clamp 28 is in place, the upper form 22 is actuated to be lowered over the lower form 16. The plastic tubes 14 are then sandwiched between the upper and lower forms 22, 16 respectively in the appropriate bent position. With the main clamp 28 in place, the halogen infrared lights 66, 72 are actuated. The lights are timed to remain on for approximately twenty-eight seconds, but may vary depending upon the material used and its thickness. The position of the halogen infrared lights in relation to the plastic tubes 14 directs the heat from the lights only to the bend portions of the tubes 14 so that the remainder of the tubes 14 are unaffected by the halogen infrared lights 66, 72, and are thereby not heated. The heat from the lights pass through the Teflon machine 10. The Teflon material of the bending machine 10 acts an insulator and does not absorb the infrared energy. Therefore, the bending machine does not get hot. The halogen infrared light has a controlled medium wave of 2.5 to 3.5 microns. After the predetermined time has elapsed for heating the tubes 14 with the halogen infrared light, the lights are deactivated and ported air is sent through pipes 73 to the bending machine 10 to cool the tube 14. The tubes are cooled by directing cold air to the bend portion of the tube, through the tube and through the fixture 10 for a predetermined amount of time.

The aforementioned bending machine and method were compared with other tube bending processing methods including the use of a large conveyor oven, a small conveyor oven, a hot air machine, a shuttle oven, a large batch oven, and a small batch oven. Some important criteria that was compared included initial start-up capital, retooling costs, cycles per hour, size limitation of parts, and floor space needed for the process. The infrared tube bending machine of the present invention had the lowest start-up cost and least amount of retooling costs in comparison to the other aforementioned processes. Further, the infrared tube bending machine occupied the least amount of valuable factory floor space. Other advantages of the present invention included that the size or shape of the tube to be bent was not limited in the subject infrared bending machine, and that the number of pieces that could be processed per hour ranked second highest with the infrared bending machine. Only the conveyor oven had a higher cycle per hour rating. In summary, the infrared bending machine offers the most efficient and cost saving method for bending thermoplastic tubes.

Figure 4:
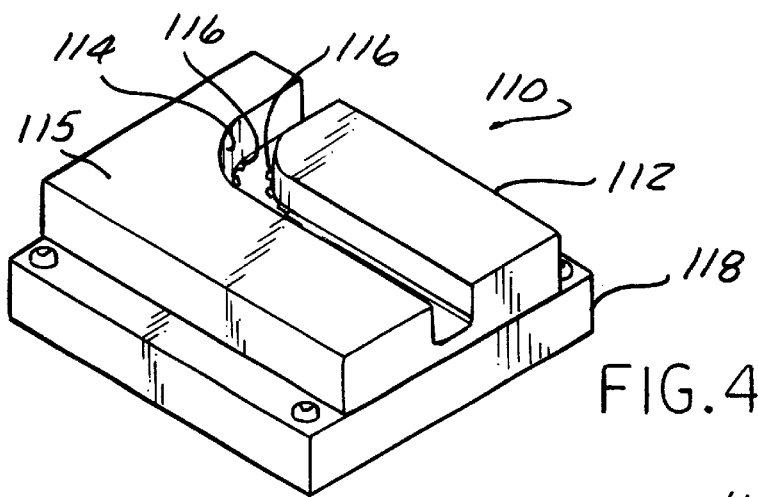
FIG. 4 is an alternate embodiment of a tool bending apparatus using hot air.
Figure 5:
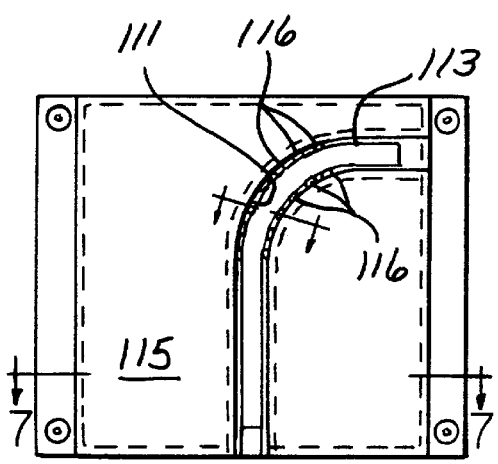
FIG. 5 is a plan view of the hot air bending assembly of FIG. 4.
Figure 6:
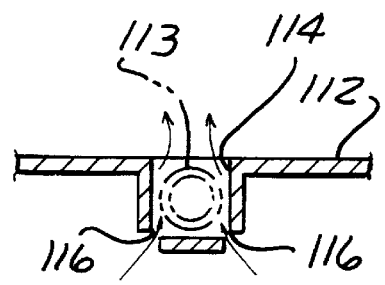
FIG. 6 is a cross-sectional of FIG. 5 taken along lines 5—5.

Another apparatus 110 for bending a plastic tube 1B is shown in FIGS. 4–8. This embodiment transfers heat via hot air directly to the bend portion 111 only of the plastic tube. Cold air is then transferred directly to the bend portion 111 of the plastic tube 113. The cold air places a permanent thermoformed bend in the plastic tube without using an oven. The structured use as shown in FIG. 4 includes upper box platform 112 made of an aluminum or similar material having a groove 114 shaped therein to correspond with the desired bend for the tube 113. FIG. 5 shows a top view of the hot and cold air former embodiment. The rectangular snaped slots 116 within the groove 114 of the upper box platform 112 represents slots 116 positioned angularly through the groove 114 for allowing hot air as well as cold air therethrough. As can be seen in FIG. 5, the slots 116 are located only in the bend portion 111 of groove 114 so that the hot and cold air is directed only to the bend portion 111 of the plastic tube. Looking at the cross sectional view of FIG. 6, it is shown how the cold and hot air are directed toward the bend portion 111 of the plastic tube and around the tube 113.

Figure 7:
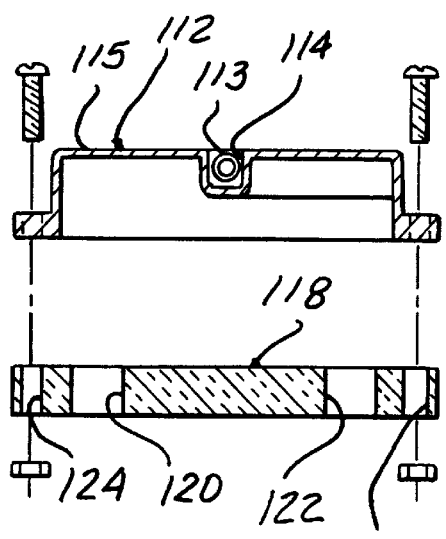
FIG. 7 is an exploded elevational view of a hot air bending assembly.
Figure 8:
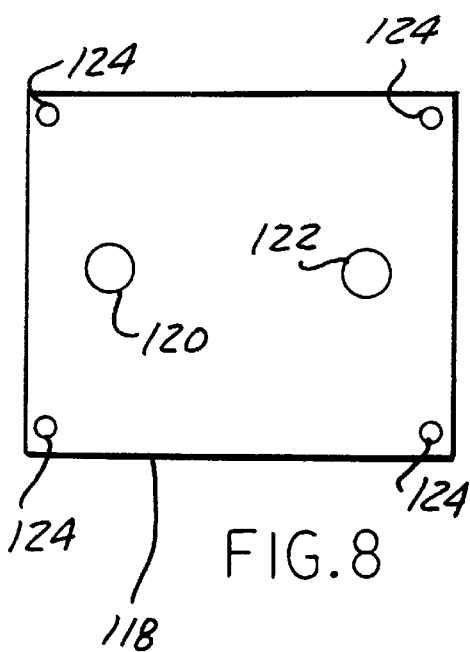
FIG. 8 is a plan view of an insulating board for the air bending assembly.

FIG. 7 shows an exploded cross-sectional view of FIG. 5 to show a lower box 118 connected to the upper box 112. The lower box 118 may be made of an insulator board material, which may include fiberglass. The lower box 118 includes two through air intake holes 120, 122. One hole 120 is connected to a cold air source (not shown) while the other hole 122 or aperture is connected to a hot air source (not shown). The lower box 118 is solid except for the hot and cold air intake holes 122, 120, respectively, and four apertures 124 for threadably connecting the lower box 118 to the upper box 112. The upper box 112 has an upper surface 115 having a groove 114 formed therein. The upper box 112 is essentially hollow to allow access of the cold and hot air therein which then is forced through the slots 116 located in the bend portion 111 of the groove 114. FIG. 8 shows the bottom view of the lower box 118. This fixture 110 enables the bending of plastic tubes on the assembly line or in an assembly cluster rather than the tubes being sent to ovens off the line and bent therein, which generally is in a different and remote location. This streamlines the process and cuts tooling costs. As a result, throughput is significantly increased.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. Such modifications may include the use of infrared lights placed over the upper box platform 112 to speed up the heating process of the tube. Another modification may include the use of hot air being directed to the bend of the tubes 14 located in the infrared tube bending machine.

What is claimed is:

1. An apparatus for forming a permanent bend in a thermoplastic tube comprising:
    a former having an upper portion and lower portion, said upper portion connected to said lower portion and said upper portion having an exposed upper surface spaced from said lower portion;
    means for support the tube within the former, said means for supporting the tube including a groove in the exposed upper surface for receiving the tube, said groove having a bend;
    means for directing heat from an outside source only to the bend in the groove; and
    means for transferring cold air from another outside source directly to the bend of the tube, wherein the upper portion is essentially a box forming a hollow interior between the upper surface and the lower portion; and
    wherein the groove has through slots at the bend providing means for fluid transfer between the hollow interior and the groove.

2. The apparatus of claim 1, wherein the lower portion of the former is essentially a solid box having at least one air access aperture therethrough to the hollow interior of the upper portion.

3. The apparatus of claim 1, wherein said slots are positioned only in the bend of the groove.

4. An apparatus for forming a permanent bend in a thermoplastic tube comprising:
    a structure having a hollow top box directly attached to a solid bottom plate and forming an enclosed hollow interior therebetween, said top box having an exposed upper surface, said upper surface having a groove formed therein for receiving the tube and forming a corresponding protuberance in the hollow interior, said groove having a predetermined configuration having at least one bend portion and at least one linear portion;
    means for transferring at least one of heated air and cold air to the hollow interior of the structure; and
    means for directing the air in the hollow interior to only the bend portion of the groove.

5. The apparatus of claim 4, wherein said means for transferring at least one of heated and cold air to the hollow interior is a through aperture formed in the bottom plate.

6. The apparatus of claim 4, wherein the tube is exposed on the upper surface when received in the groove.

7. An apparatus for forming a permanent bend in a thermoplastic tube comprising:
    a structure having a top plate and a bottom plate and an enclosed hollow interior therebetween, said top plate having an exposed upper surface, said upper surface having a groove formed therein for receiving the tube, said groove having a predetermined configuration having at least one bend portion;
    means for transferring at least one of heated air and cold air to the hollow interior of the structure; and
    means for directing the air to only the bend portion of the groove wherein said means for transferring at least one of heated and cold air to the hollow interior is a through aperture formed in the bottom plate; and wherein said means for directing the at least one of heated and cold air to the bend portion includes at least one through slot in the top plate positioned in the groove at the bend portion.

8. The apparatus of claim 7, wherein the groove has corners and the slots are located through the corners in the groove of the top plate.

9. The apparatus of claim 7, wherein the bottom plate is made of insulating material.

* * * * *